(12) United States Patent
Shapcott

(10) Patent No.: US 6,187,235 B1
(45) Date of Patent: Feb. 13, 2001

(54) METHOD FOR PROCESSING BOTTLE CAPS

(75) Inventor: Michael Shapcott, Lehighton, PA (US)

(73) Assignee: Zapata Technologies Incorporated, Hazelton, PA (US)

( * ) Notice: Under 35 U.S.C. 154(b), the term of this patent shall be extended for 0 days.

(21) Appl. No.: 09/144,332

(22) Filed: Aug. 31, 1998

(51) Int. Cl.[7] .............. B29C 33/02; B29C 33/18; B29C 45/14

(52) U.S. Cl. .............. 264/102; 264/268; 264/269; 264/DIG. 78

(58) Field of Search .............. 264/102, 259, 264/267, 268, 269, DIG. 78, 319, 320, 296; 425/110, 113, 114, 126.1, 129.1, 546, 547

(56) References Cited

U.S. PATENT DOCUMENTS

| | | | |
|---|---|---|---|
| 3,633,742 | 1/1972 | Melton | 209/80 |
| 3,717,248 | 2/1973 | Scribner | 209/73 |
| 3,724,655 | 4/1973 | Clark | 209/73 |
| 4,085,186 | * 4/1978 | Rainer | 264/268 |
| 4,088,730 | * 5/1978 | Wilde | 264/268 |
| 4,130,213 | * 12/1978 | Wszolek | 264/268 |
| 4,140,451 | * 2/1979 | Herdzin, Jr. et al. | 264/268 |
| 4,198,369 | * 4/1980 | Yoshikawa et al. | 264/268 |
| 4,260,482 | 4/1981 | Nicholson et al. | 209/539 |
| 4,274,822 | * 6/1981 | Tamai et al. | 264/268 |
| 4,298,320 | 11/1981 | Ohmi et al. . | |
| 4,654,963 | * 4/1987 | Sugalski | 264/268 |
| 4,988,467 | * 1/1991 | Holdsworth et al. | 264/255 |
| 5,137,164 | * 8/1992 | Bayer | 215/352 |
| 5,259,745 | 11/1993 | Murayama . | |
| 5,332,381 | * 7/1994 | Shapcott | 425/127 |
| 5,340,525 | * 8/1994 | Czernik | 264/266 |
| 5,686,040 | * 11/1997 | Taber | 264/322 |

* cited by examiner

*Primary Examiner*—Angela Ortiz
(74) *Attorney, Agent, or Firm*—Pennie & Edmonds LLP

(57) ABSTRACT

The present invention provides an apparatus and method for processing lined caps. The method includes the step of molding at an elevated temperature a liner having a raised sealing ring inside the cap, and advancing a stream of lined caps from a first position to a second position, while supplying cooling air to the lined caps to cool the liner and form a skin at least on an upper surface of the sealing ring. The method may further include the step of applying a vacuum to remove undesirable gases from the liner. The vacuum can also be applied within the raised sealing ring to create suction to lift properly formed lined caps from the advancing stream. The cooling, gas removal, and inspection steps can occur at the cap processing rate. The present invention further provides an apparatus for processing a bottle cap. The apparatus includes a plurality of rotary turntables for sequentially cooling, inspecting, and removing the bottle caps. The first turntable receives the lined caps from the molding machine at a first position, and advances the lined caps to a second position through an enclosure with cooling air. The second turntable includes inspection stations at spaced circumferential positions and a vacuum pump for directing a vacuum to the inspection stations. The vacuum creates suction that lifts the lined cap into contact with the station. If the lined cap is properly formed the suction keeps the cap in contact with the station, if not the cap falls out of contact with the station. Properly formed caps are removed from their elevated position at the third turntable.

6 Claims, 8 Drawing Sheets

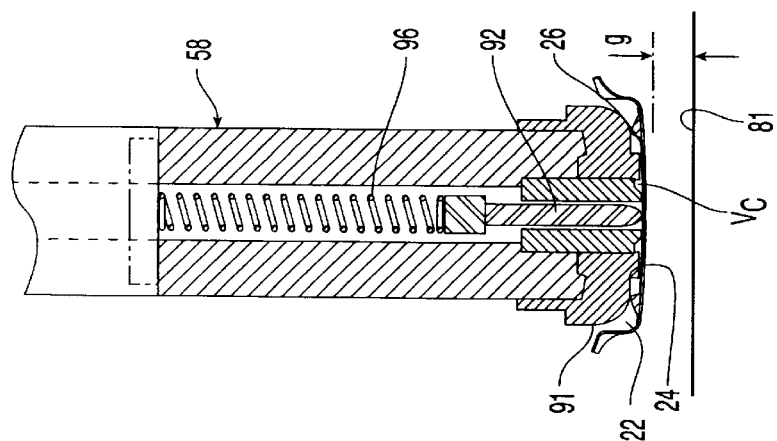
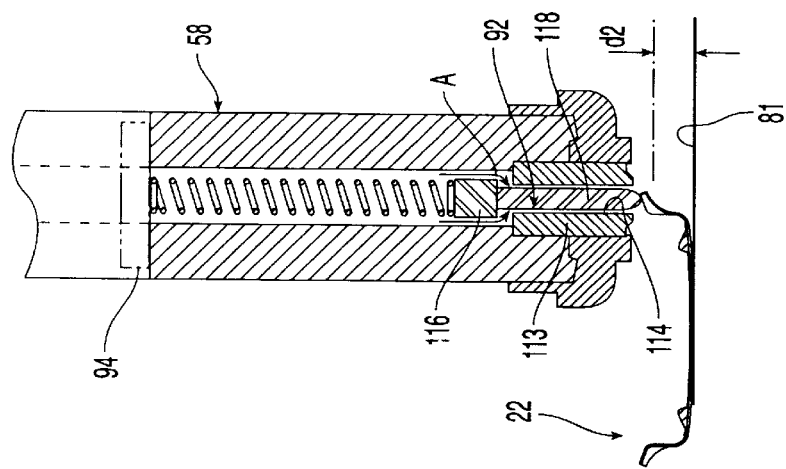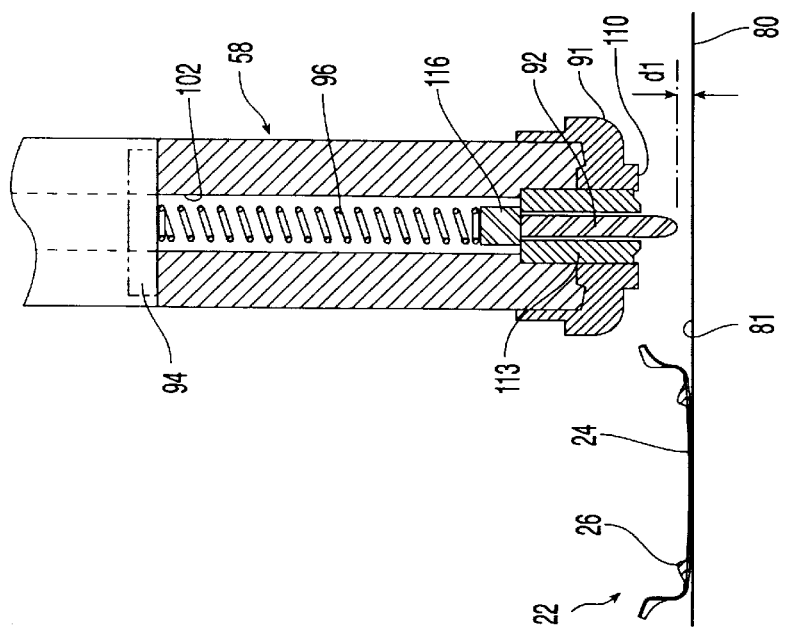

METHOD FOR PROCESSING BOTTLE CAPS

TECHNICAL FIELD OF THE INVENTION

The present invention relates to a method for processing container closures, with a shaped liner, such as bottle caps, and more particularly, to a method for cooling, removing volatiles, and/or inspecting these closures. The invention also relates to an apparatus for processing bottle caps in the aforementioned fashion.

BACKGROUND OF THE INVENTION

In a number of industries it is desirable to use storage containers that seal. For example, glass bottles sealed with cover closures, called "bottle caps," are used by beverage manufactures to store beverages. Bottle caps generally include a circular top panel, a cylindrical skirt extending from the peripheral edge of the top panel, and a liner. The liner is disposed on the inside of the top panel. The liner usually includes a raised sealing ring, which mates with the bottle to form a seal.

A number of different processing steps go into properly forming bottle caps. The liner, which is commonly formed of plastics such as polyvinyl chloride resin is molded into the cap at an elevated temperature. Formation in this way imbeds gases or volatiles within the liners. As the liners age, these gases can escape and reduce the purity and potentially the flavor quality of the bottle's contents. Therefore, it is desirable to have a process for removing these gases during manufacture.

In an effort to prevent bottle caps from sticking to various machine parts during processing, it is desirable to cool the liners after molding. U.S. Pat. No. 4,260,483 issued to Nicholson et al. discloses one method of cooling bottle caps using a cooling station with a conveyor belt. The belt moves slowly so that ambient air contacts and cools the liners. In this patent there is a concern about cooling the liners too quickly, so an enclosure is placed over the conveyor to further slow cooling. In order for this cooling station to work at a rate that is compatible with automated molding machine, rows of caps are processed on the conveyor at the same time. However, this type of set up may require a significant amount of space for the conveyor belt.

Another aspect of manufacturing bottle caps is related to a number of liner defects that occur. One defect occurs when the cap is formed without the liner. When a liner-free cap is applied to the bottle, this empty cap is not sealed. Another defect occurs when the liner sealing ring is formed with internal gaps or voids or formed in the improper shape. Any of these defects in the ring can result in a poor seal, which results in the undesirable consequences of air or contaminants entering the container. Another consequence is that a poor seal may lead to the contents of the bottle spoiling. For some applications, it is also considered a defect when a portion of the liner is molded on the cap skirt. This misplaced liner may prevent the cap from properly fitting on the container. If the cap is loose enough, the contents of the bottle may spill or the bottle may have a poor seal. A more serious consequence of the misplaced liner occurs when such a liner strains an automatic capping machine to the point where the glass container ruptures. If this occurs during manufacturing, the machines are stopped and possibly serviced, which is costly.

In an effort to minimize the consequences of defective caps, processing bottle caps typically includes inspecting the lined caps. Properly lined caps are shipped for use, and improperly lined caps are rejected and not used. Inspection can be manual or automated. In an automated, high-production environment it is desirable to inspect the caps at the cap processing rate, which is the speed at which the liners are molded. Since manual inspection is too slow to keep up with the cap processing rate, automated inspection machines are preferred.

Several patents have been issued which are directed towards automated inspection machines. For example, U.S. Pat. No. 3,724,655 issued to Clark discloses an apparatus for testing gasket thickness and sealing, and rejecting caps with gaskets that are not without a predetermined thickness range or that do not seal properly. The testing apparatus includes a memory wheel with movable pins. The position of the pins is used to sort unacceptable from acceptable caps. As the use of the memory wheel makes the testing apparatus complex and increases testing time; this solution is less desirable and thus not a preferred one.

The present invention is intended to provide a method and apparatus for processing lined caps in a simple yet efficient manner by cooling the lined caps, removing volatiles from the lined caps, and inspecting the lined caps while operating at the cap processing rate.

SUMMARY OF THE INVENTION

Accordingly, the present invention provides a method of processing bottle caps comprising the steps of molding a liner with a raised sealing ring having an upper surface inside the cap at an elevated temperature to form lined caps; and advancing a stream of lined caps from a first position to a second position while supplying cooling air to the lined caps to cool the liner sufficiently rapidly to form a skin at least on the upper surface of the sealing ring before the caps arrive at the second position. The skin prevents plastic deformation and sticking of the liner during further processing. In a preferred embodiment, the molding and advancing steps operate at the same cap processing rate. Advantageously, the method according to the present invention provides a rapid way of cooling lined caps.

In another embodiment, the method further includes the step of applying a vacuum to the liner, the vacuum is sufficient to remove volatiles from the liner. If the vacuum is applied within the raised sealing ring, it can create suction to lift properly formed lined caps from the advancing stream. In the most preferred embodiment, the same vacuum which removes volatiles also inspects the lined caps. This makes the processing extremely efficient, and the application of the vacuum is capable of matching the cap processing rate.

The present invention further provides an apparatus for processing a bottle cap. The apparatus is operatively associated with a molding machine for molding a liner inside of the cap at an elevated temperature to form lined caps. The liner includes a raised sealing ring having an upper surface. Specifically, the apparatus comprises a rotating first turntable for receiving the lined caps from the molding machine at a first position and advancing the lined caps to a second position; a cooler for supplying cooling air; and an open-ended enclosure that extends between the first position and the second position. Advantageously, the enclosure forms a channel through which the first turntable rotates, the enclosure is adapted to receive the cooling air in the channel, so that as the first turntable moves the lined caps from the first position to the second position through the channel the liner is exposed to the cooling air and is cooled. The cooler is preferably an air cooler that supplies cooling air.

In a preferred embodiment, the apparatus further includes a rotating second turntable, a vacuum pump, and at least one inspection station. The rotating second turntable receives the lined caps from the first turntable at the second position and advances the lined caps toward a third position. The vacuum pump draws a vacuum and applies it to the caps. The inspection station is coupled to the second turntable.

The inspection station preferably includes a housing, a vacuum tip, a stopper, and a spring. The housing defines a channel that is in fluid communication with the vacuum pump. The vacuum tip is connected to the working end of the housing and has a central passage for fluid communication between the channel and the exterior of housing. The stopper is movable between open and closed positions for selectively opening and closing the central passage. The spring is disposed within the channel, and biases the stopper into the closed position. When the inspection station is at the second position, the lined cap is disposed below the vacuum tip and forces the stopper to the open position, so that the vacuum applies a suction force to the lined cap. The suction force lifts the lined cap into contact with the vacuum tip. If the lined cap is properly formed, the suction force is greater than the spring force and the cap travels on the inspection station to the third position. If the lined cap is improperly formed, the spring force is greater than the suction force, and the spring biases the stopper into the closed position and cause the cap to lose contact with the inspection station. Thus, the apparatus provides suction that inspects lined caps, and removes undesired gases from the liners.

It is further preferred that a plurality of inspection stations are attached to the second turntable at spaced circumferential locations, such as at 10 or 15 degree intervals, so that inspection and gas removal operate at the cap processing rate.

The foregoing features and other features and advantages of the present invention will become apparent in light of the following description and accompanying drawing.

BRIEF DESCRIPTION OF THE DRAWING

FIG. 9 is an enlarged, cross-sectional view of a portion of the inspection station, wherein the stopper is in a closed position and the lined cap is adjacent thereto.

FIG. 10 is an enlarged, cross-sectional view of a portion of the inspection station of FIG. 9, wherein the stopper is in an opened position and the lined cap is adjacent thereto in a lower position.

FIG. 11 is an enlarged, cross-sectional view of a portion of the inspection station of FIG. 9, wherein the stopper is in the opened position and the lined cap is aligned therewith in a raised position.

DETAILED DESCRIPTION OF THE PREFERRED EMBODIMENTS

Figure 1:
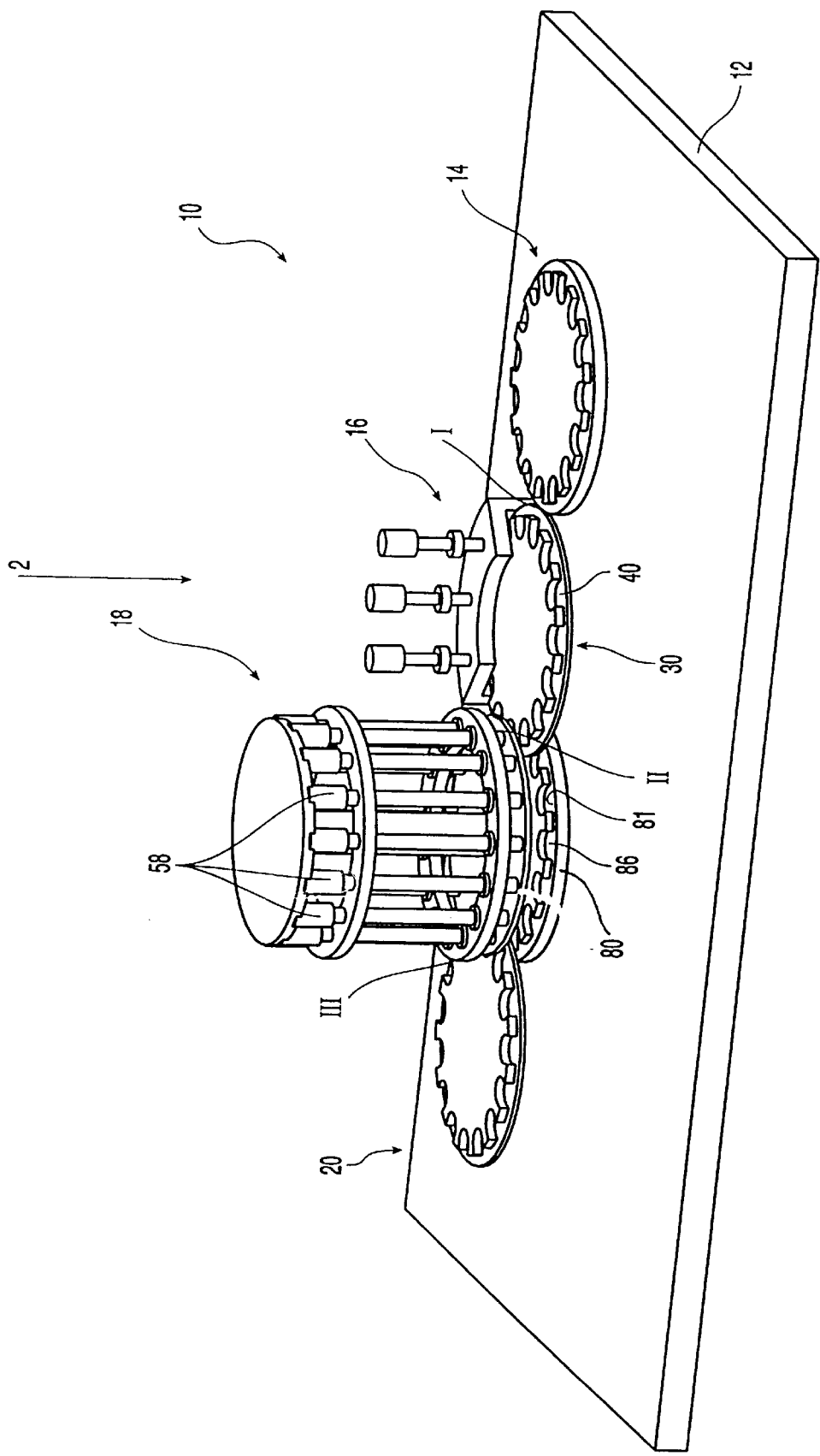
FIG. 1 is a schematic, partial, perspective view of an apparatus for processing lined caps according to the present invention.
Figure 2:
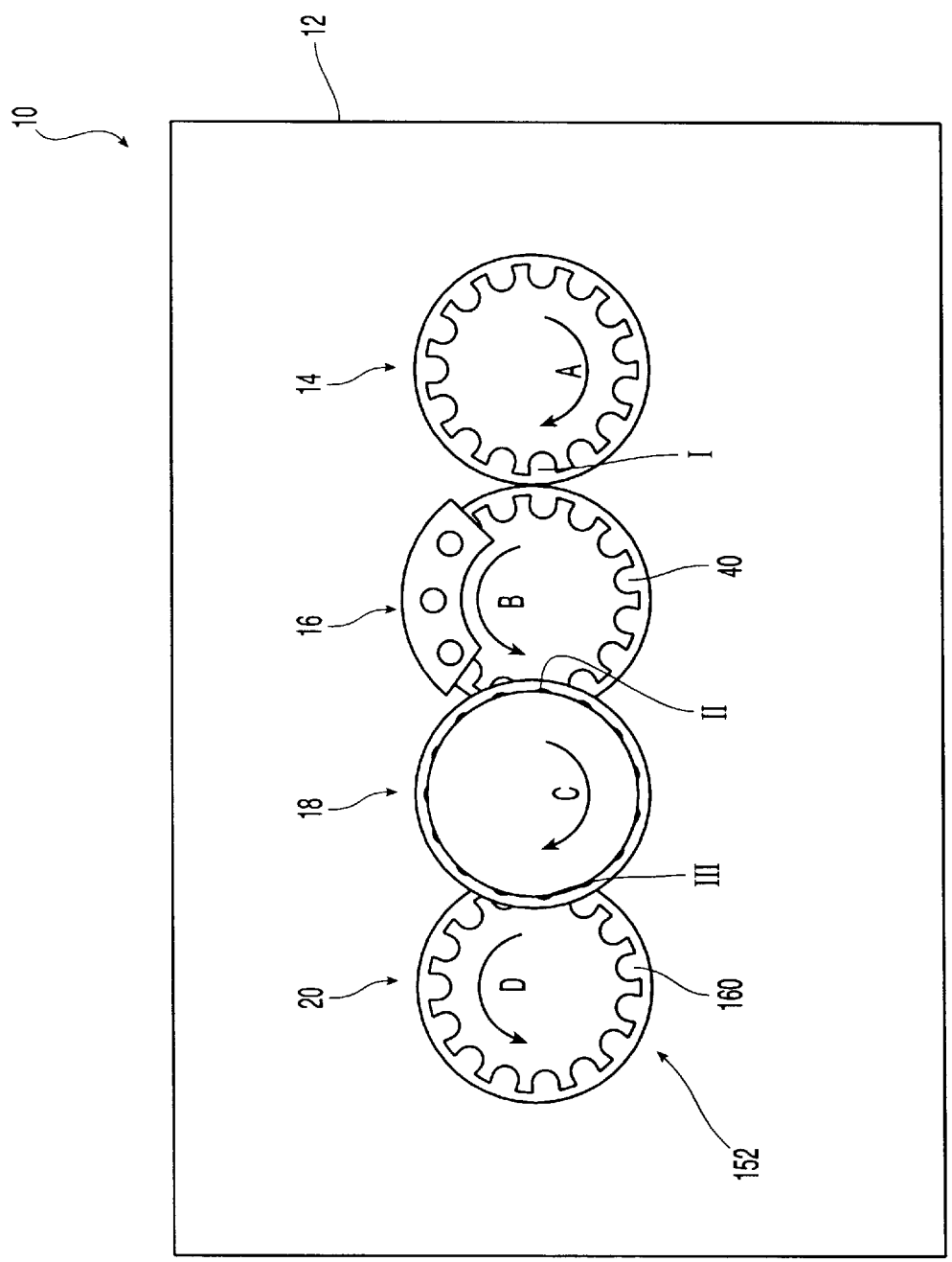
FIG. 2 is a top view along the arrow 2 of FIG. 1 of the apparatus for processing lined caps according to the present invention.
Figure 3:
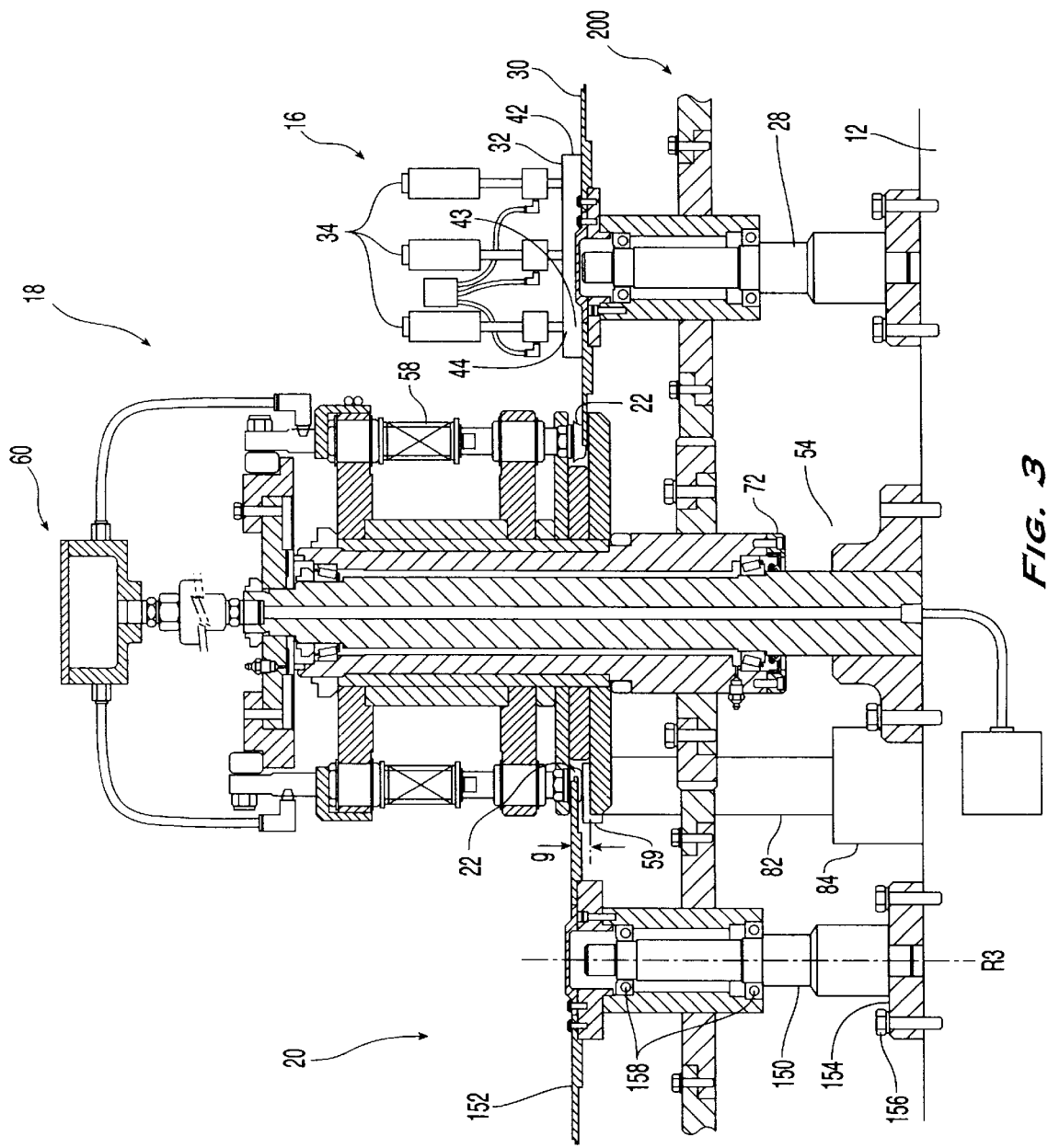
FIG. 3 is a partial, cross-sectional view of the apparatus of FIG. 2 of the present invention.

Referring to FIGS. 1–3, an apparatus 10 for processing lined caps 22 includes a machine table 12 that supports a molding machine 14, a cooling station 16, a vacuum inspection apparatus 18, and a removal device 20.

Figure 7:
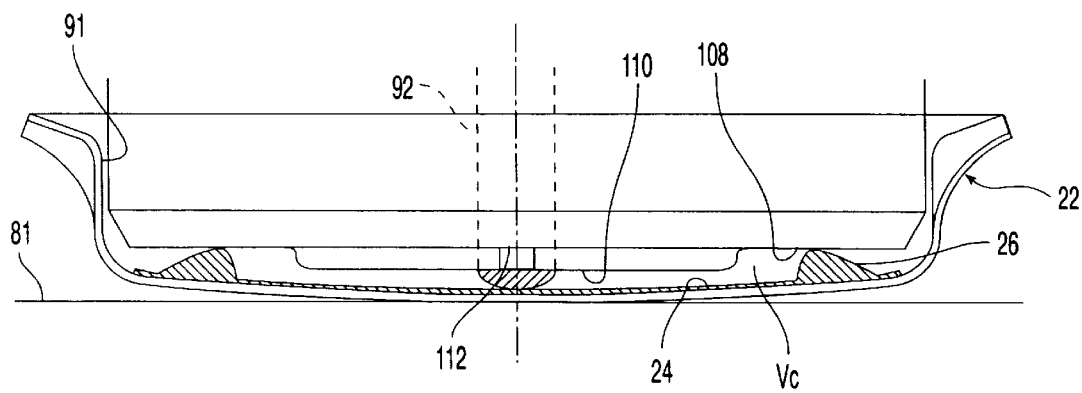
FIG. 7 is an enlarged, cross-sectional view of a portion of the inspection station, wherein a properly lined cap is aligned therewith.

Referring to FIGS. 1–2 and 7, the molding machine 14 is a rotary machine, as indicated by the arrow A. The molding machine 14 forms lined cap 22 by molding a liner 24 with a raised sealing ring 26 into the inside of the cap 22. This molding occurs at an elevated temperature. The molding machine 14 used herewith is commercially available and manufactured by Zapata® Technologies Inc. under the name ZA-matic Crown Lining Machine.

Referring to FIGS. 1–3 and 7, the cooling station 16 is a rotary machine, as indicated by the arrow B. The cooling station receives lined caps 22 from the molding machine 14 at a first position, designated by the numeral I. The cooling station 16 advances a stream of lined caps from the first position I to a second position, designated by the numeral II.

While the cooling station 16 advances the caps, it supplies cooling air to the lined caps to cool the liner 24 and form a skin at least on the upper surface of the sealing ring 26.

Figure 4:
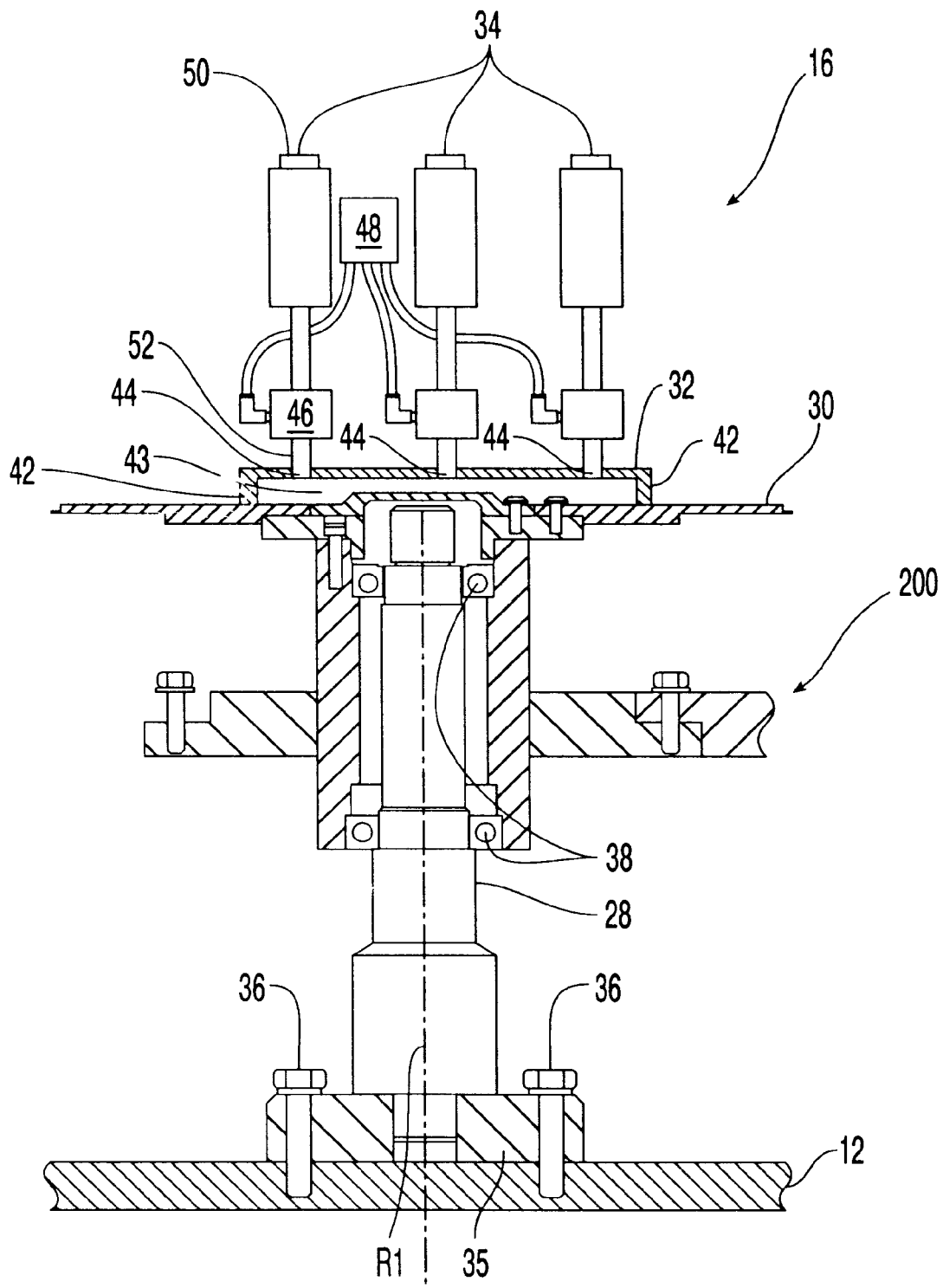
FIG. 4 is an enlarged, partial cross-sectional view of a cooling station of the apparatus of the present invention.

Referring to FIGS. 3 and 4, the cooling station 16 includes a shaft 28, a rotating first turntable 30, an enclosure 32, and a plurality of cooler assemblies 34. The shaft 28 is fixedly secured to a base 35. Base 35 is secured to the machine table 12 by bolts 36.

Referring to FIGS. 1, 3, and 4, the rotating first turntable 30 is rotatably mounted to the shaft 28 using ball bearings 38. The axis of rotation R1 extends longitudinally along the shaft 28. The upper surface of the first turntable 30 includes a plurality of recesses 40. The recesses 40 are formed at spaced circumferential locations around the periphery of the turntable 30. The recesses 40 receive the lined caps 22 from the molding machine 14.

Referring to FIG. 4, the enclosure 32 has open-ends 42, and forms a channel 43 along a sector of the first turntable 30. The enclosure 32 further includes three circumferentially spaced bores 44 from the enclosure through the upper wall to the channel 43.

The cooler assemblies 34 supply cooling air into the channel 43. Each cooler assembly 34 includes a cooler 46 adapted to received air from an air supply 48 and exhaust air from a port 50. The cooler 46 has a tube 52 disposed in the associated enclosure bore 44 for transporting cooling air to the channel 43. It is preferred that the coolers 44 are air coolers. A suitable cooler is a commercially available Vortex cooler.

Figure 5:
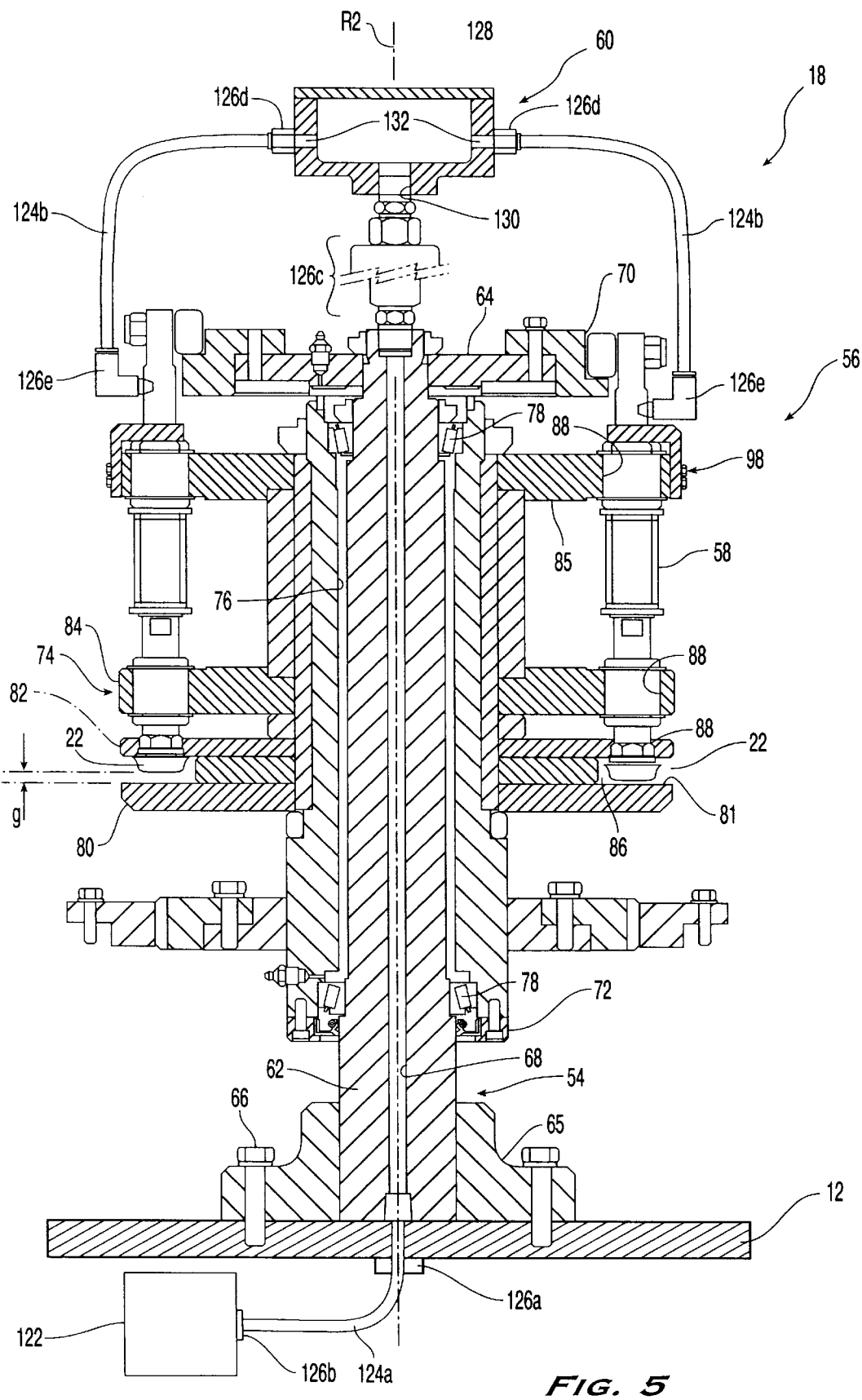
FIG. 5 is an enlarged, cross-sectional view of a vacuum inspection apparatus of the present invention.

Referring to FIG. 2, the vacuum inspection apparatus 18 is a rotary machine, as indicated by the arrow C. The inspection apparatus 18 removes gases from the lined caps and inspects the lined caps. Turning to FIGS. 3 and 5, the inspection apparatus 18 includes a fixed assembly 54, a rotating assembly 56, a plurality of inspection stations 58, a stripping member 59, and a vacuum assembly 60.

Referring to FIG. 5, the fixed assembly 54 includes a shaft 62 and a support disk 64. The vertically extending shaft 62 is fixedly mounted to a base 65. The base 65 is mounted to the machine table 12 by bolts 66. The shaft 62 includes a longitudinally extending bore 68. The axis of rotation R2 extends longitudinally along the center of the bore 68.

The support disk 64 is coaxially mounted to the shaft 62 and spaced from the machine table 12. The support disk 64 includes an attached stepped cam surface 70 that extends about the periphery of the support disk 64.

The rotating assembly 56 includes an end cap 72 and a second turntable 74. The end cap 72 circumscribes the outside of the shaft 62. The end cap 72 supports the second turntable 74 on the shaft 62.

The second turntable 74 includes a central bore 76 for receiving the shaft 62. The second turntable 74 is rotatably mounted to the shaft 62 using thrust bearings 78 within the bore 76.

Referring to FIGS. 1 and 5, the second turntable 74 further includes spaced first, second, third, and fourth disks 80, 82, 84, and 85, respectively. The first disk 80 includes an upper surface 81 having a plurality of recesses 86 formed at spaced circumferential locations around the periphery of the disk 80. The recesses 86 receive the lined caps 22 from the cooling station 16. In this embodiment, there are twenty-four (24) recesses. One recess 86 every 10°.

Referring to FIG. 5, the second, third, and fourth disks 82, 84, and 85 support the inspection stations 58. The second, third, and fourth disks 82, 84, and 85 include circumferentially spaced bores 88 aligned with the recesses 86. The bores 88 receive the inspection stations 58 therethrough.

Referring to FIGS. 2 and 3, the stripping member 59 extends radially inwardly along the upper surface 81 of the first disk 80. It removes improperly formed lined caps from the first disk 80 prior to these caps reaching the third position III. The member 59 guides improperly formed lined caps down a chute 87a to a bin 87b. This configuration is commonly used in the cap processing industry; however, other configurations can also be used.

Figure 6:
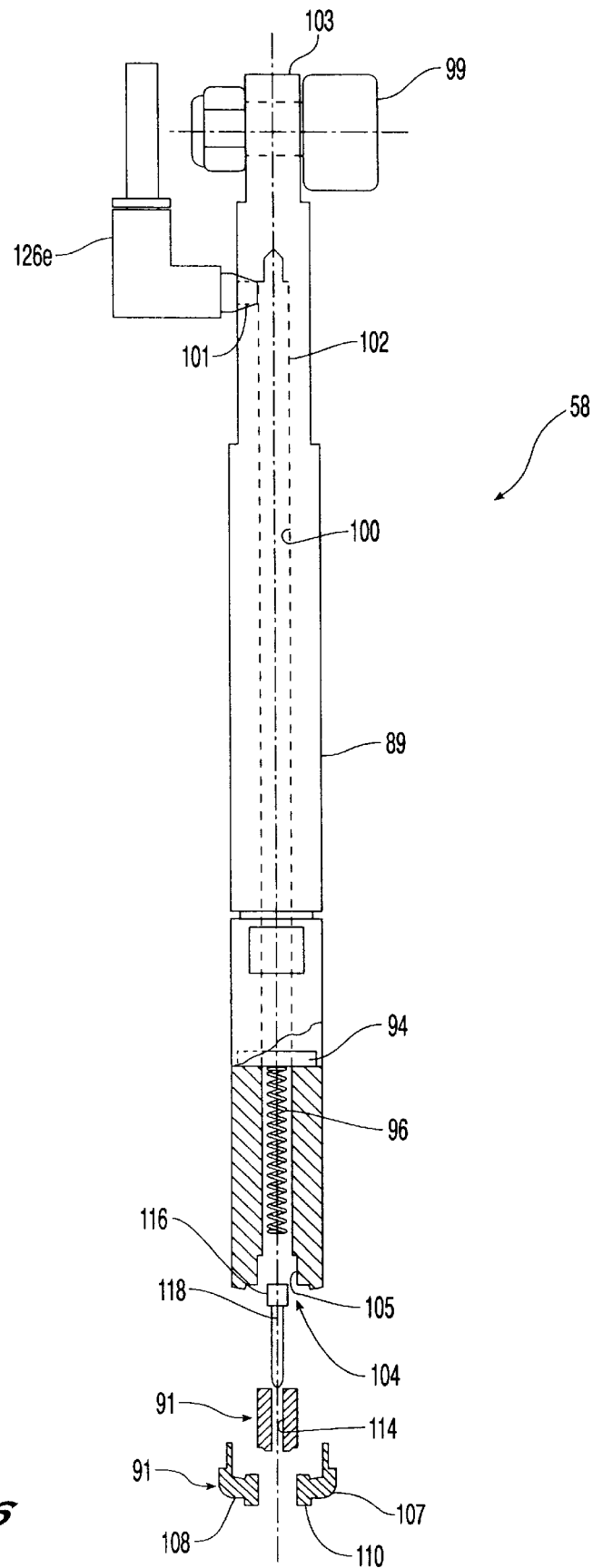
FIG. 6 is an enlarged, exploded front view of an inspection station of the apparatus of the present invention, wherein portions are removed for clarity.

Referring to FIGS. 1, 5, and 6, the inspection stations 58 are located at spaced circumferential locations about the second turntable 74. Each inspection station includes a housing 89, a vacuum tip 91, a stopper 92, a pin 94, a spring 96, a clamp 98 (as shown on FIG. 5), and a follower 99.

The housing 89 is cylindrical and defines a channel 100 that is in fluid communication with the vacuum assembly 60 (as shown in FIG. 5). The channel 100 is L-shaped and has a transversely extending first portion 101 and a longitudinally extending second portion 102.

The housing 89 further includes a closed end 103 and a spaced open or working end 104. The open end 104 has an internally threaded passage 105 therethrough.

Figure 8:
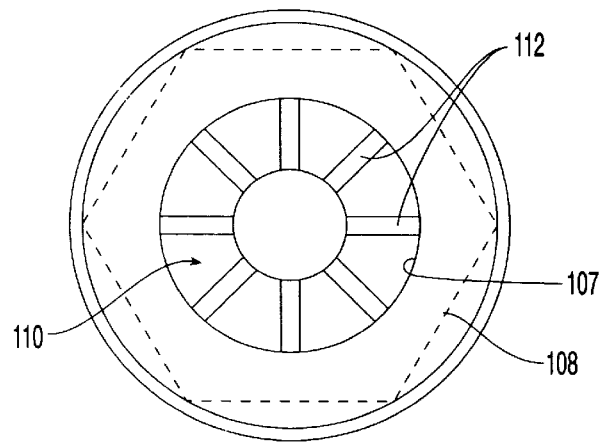
FIG. 8 is an enlarged, bottom view of the inspection station, wherein a stopper has been removed for clarity.

Referring to FIGS. 6–8, the vacuum tip 91 is cup shaped and includes a central passage 107, sealing surface 108, and a projecting surface 110. The central passage 107 has internal threads therein. The projecting surface 110 is disposed in the center of the sealing surface 108, and extends outwardly therefrom. The projecting surface 110 includes a plurality of notches 112 therein. The notches extend radially outwardly from the passage 107 across the projecting surface 110.

The vacuum tip 91 further includes a set screw or screw member 113. The set screw 113 attaches the vacuum tip 91 to the working end 104 of the housing via external threads on the set screw that attach the set screw to the housing within passage 105 and attach the set screw to the vacuum tip within passage 107. The set screw 113 is longitudinally adjustable within the passage 105. The set screw 113 further includes a central passage 114 for receiving the stopper 92 and allowing fluid communication between the channel 100 and the exterior of the housing 89.

The stopper 92 selectively opens and closes the central passage 107. The stopper 92 has an enlarged head 116 and shaft 118 extending therefrom. The stopper 92 is disposed within the passage 114 of the set screw 113, so that the enlarged head 116 is in the housing channel 102, and the shaft 118 extends through the passage 114. The stopper and housing are configured so that the passage 114 has a greater diameter than the shaft 118 but a smaller diameter than the head 116 of the stopper. This allows the inspection station 58 to function as discussed below.

The housing 89 is adapted to rotatably mount the follower 99 thereon near the closed end 103. In operation, the follower 99 is in rolling contact with the cam surface 70 (as shown in FIG. 5). Each inspection station 58 hangs vertically from the follower 99.

Referring to FIGS. 6 and 9, the pin 94 extends transversely through the housing 89 across the bore 102. The pin 94 is positioned between the housing closed end 103 and open end 104. The spring 96 is disposed within the housing channel 102 between the pin 94 and the stopper head 116. The spring 96 biases the stopper 92 into a closed position. By adjusting the position of the set screw 113 the position of the stopper 92 is also adjusted along with the spring force.

Referring to FIG. 5, each clamp 98 is L-shaped and mounted to the edge of the fourth disk 85. The clamp 98 receives the inspection station 58 therethrough and secures each inspection station 58 to the turntable 74.

Referring to FIGS. 3 and 5, the vacuum assembly 60 provides a predetermined vacuum to each inspection station 58. The vacuum assembly 60 includes a vacuum pump 122, a plurality of conduits 124a–b, a plurality of fittings 126a–e, and a chamber 128.

The vacuum pump 122 is conventional and is selected so that it provides the necessary pressure to create suction at each inspection station 58. The vacuum pump 122 is in communication with the shaft bore 68 of the inspection apparatus 18, through the conduit 124a. The conduit 124a is secured to the machine table 12 by the fitting 126a, and secured to and the pump 122 by the fitting 126b.

The shaft bore 68 is in communication with the chamber 128 through the fitting 126c mounted to the top of the shaft 62. The fitting 126c allows the chamber 128 to rotate with the rotation of the rotating assembly 56.

The chamber 128 includes a central bore 130, which receives the fitting 126c and a plurality of circumferentially spaced bores 132 through the sidewalls. The chamber 128 is in communication with each inspection station 58 through the conduits 124b. The conduits 124b are attached to the chamber 128 by the fittings 126d through bores 132. The conduits 124b are attached to each inspection station 58 by the fittings 126e. Referring to FIG. 6, the fitting 126e extends into the bore 101. The fittings 126a–e and conduits 124a and 124b are commercially available. The chamber 128 acts as a manifold for distributing the vacuum to each inspection station 58.

Referring to FIGS. 2 and 3, the removal device 20 is a rotary machine, as indicated by the arrow D. The removal device 20 receives properly lined caps 22 from the inspection apparatus 18. The removal device 20 includes a shaft 150 and a rotating third turntable 152. The shaft 150 is fixedly secured to a base 154. The base 154 is secured to the machine table 12 by bolts 156.

The rotating third turntable 152 is rotatably mounted to the shaft 150 using ball bearings 158. The axis of rotation R3 extends longitudinally along the shaft 150.

Referring to FIG. 2, the upper surface of the third turntable 152 includes a plurality of recesses 160. The recesses 160 are formed at circumferentially spaced locations along the periphery of the third turntable 152.

Referring to FIG. 3, the third turntable 152 is spaced from the inspection apparatus first disk 80, so that a gap having a height, designated by the letter g, is formed therebetween. In order to be received within the third turntable recess 160, the cap 22 is raised the gap height g above the first disk 80.

The method for processing bottle caps and the operation of the apparatus 10 will now be discussed. Referring to FIGS. 1 and 3, in operation, it is preferred that a single motor (not shown) provides the rotary motion for all of the components 14, 16, 18, and 20 through a gear train 200 that includes conventional ring gears.

Referring to FIGS. 1 and 7, the molding machine 14 molds the liner 24 in the cap 22 at an elevated temperature. At the first position I, the lined caps 22 are serially transferred to a waiting recesses 40 of the cooling station 16. A conventional apparatus is used for this transfer.

Referring to FIGS. 1–4, the cooling station 16 advances a stream of lined caps from the first position I to the second position II. As the caps advance, each cap enters the channel 43 within the enclosure 32. The coolers 46 receive air from the air supply 48, cool the air, and supply cooling air to the channel 43 and the lined caps therein. The air is then exhausted through port 50.

The coolers 46 cool the liner 24 and form a "skin" at least on an upper surface of the sealing ring 26. The term "skin" in this specification and the claims means a thin layer of liner, which has solidified enough not to plastically deform or stick during further processing.

Referring to FIGS. 1 and 9, prior to each inspection station 58 reaching the second position II, the stopper 92 is in a first or closed position, where the spring 96 is in an uncompressed state. The stopper 92 free end is a distance d1 from the upper surface 81 of the disk 80. Once the lined cap 22 and the associated inspection station 58 reach the second position II, the cap 22 is transferred onto the first disk 80 from recess 40 to recess 86. A conventional apparatus is used for this transfer.

As shown in FIGS. 5 and 9–11, as the cap 22 enters recess 86, the cap causes the stopper 92 to move upward to a second or open position, where the distance between the stopper 92 and the surface 81 is a distance d2. As a result, the stopper enlarged head 116 moves upward away from the set screw 113 and compresses the spring 96 against the pin 94. As shown in FIG. 10, once the enlarged head 116 raises, the stopper 92 is in the open position and vacuum air passes around the enlarged head 116 and shaft 118 through passage 114, as indicated by the arrow A.

Referring to FIGS. 5, 6, and 10, the vacuum air A is created by the vacuum pump 122 and distributed to the inspection stations 58 through the conduits 124a and 124b, and manifold 128. The air travels from the conduit 124b to the fitting 126e then through the bores 101 and 102 in each inspection station 58.

Turning to FIGS. 7 and 10, if there is a properly formed liner and sealing ring 26 in the cap 22 when the vacuum tip 91 sealing surface 108 contacts the ring 26, a vacuum chamber $V_C$ is created between the tip 91 and sealing ring 26. The tip moves toward the cap, so that the stopper is further depressed, which continues to release the vacuum air A. The projecting surface 110 reduces the vacuum chamber area so that less vacuum is needed to create the necessary suction. The notches also decrease the necessary vacuum required for suction. The vacuum air A exits the passage 114 and the notches 112 at end of the vacuum tip (as best shown in FIG. 8). Referring to FIG. 11, the vacuum applied within the ring 26 creates suction between the cap 22 and inspection station 58. The suction lifts the cap 22 to a raised position the height g from the surface 81. In the raised position, the cap 22 is in contact with the tip 91. The suction also draws volatiles or gases from the liner 24.

Referring to FIG. 11, the cap is in the raised position, and the spring 96 is compressed a maximum amount. A spring force is created, that is in the direction of the surface 81. If the lined cap 22 is properly formed, the suction is strong enough to resist the spring force, and the cap 22 remains in contact with the station 58.

Figure 12:
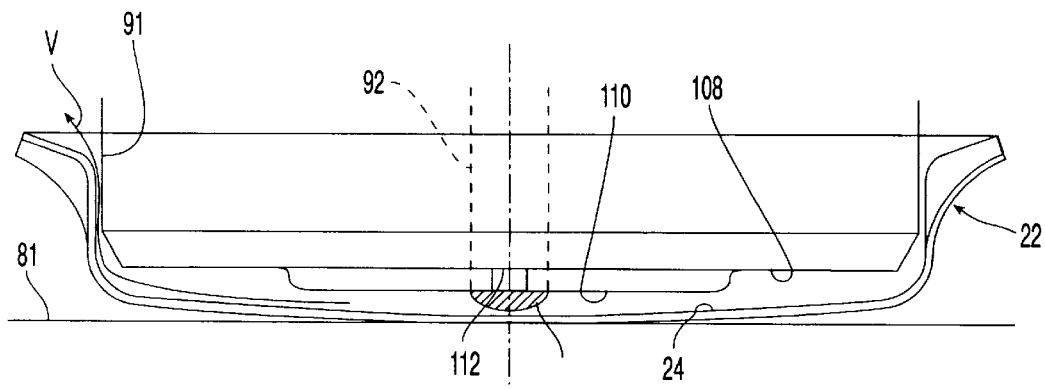
FIG. 12 is an enlarged, cross-sectional view of a portion of the inspection station of FIG. 7, wherein an improperly lined cap is aligned therewith.

Referring to FIG. 12, an improperly formed lined cap may have a missing liner, a liner with voids, a misshaped liner, or a liner that has been misplaced. If the liner is missing, the cap 22 is shaped so that the projection area 110 contacts the cap. When the stopper 92 is depressed and the vacuum air, as designated by the arrow V, is released and escapes to the atmosphere between the tip 91 and the cap 22. Thus, no vacuum chamber is $V_c$ is created and if any suction is created it is not sufficient to overcome the spring force. The notches 112 also assure that the vacuum is drawn to atmosphere so that the station cannot pick up an empty cap. Thus, the spring 96 forces the stopper 92 downward and separates the cap from the station. As the station moves upward, the cap returns to the surface 81 or remains there. The improperly formed cap is again on the first disk 80. If the sealing ring has voids, is misshaped or misplaced, the necessary vacuum chamber and suction are not created. The cap remains on the surface 81. The aforementioned inspection and gas removal steps occur as the station 58 rotates according to the arrow C (as shown in FIG. 2) between the second position II and third position III.

In another embodiment, the vacuum tip projecting surface 110 may not be present, however without this surface the vacuum necessary for the inspection station to function increases. In addition, the notches can be replaced with other features, such as bores that allow fluid communication between the vacuum chamber $V_C$ and the bore 102.

Referring to FIG. 3, as the inspection apparatus 18 continues to rotate, the improperly lined caps on the disk 80 contact the stripping member 59 and are directed down the chute 87a to the reject bin 87b.

Referring to FIGS. 2 and 3, the properly formed lined caps 22 are transported on the station 58 to the third position III. Once the station 58 with a properly lined cap 22 reaches the third position III, the third turntable 152 contacts the cap 22 at the height g above the disk 80, and the cap 22 drops into the recess 160 of the removal device 20. Then the third turntable 152 rotates according to the arrow D, and the properly formed caps 22 are subjected to additional operations, like packing or depositing in an acceptable bin (not shown). A conventional transfer device can be used to move the caps to the third turntable.

The principal advantage of the present invention is that the molding, cooling, inspecting and removal steps operate at the same cap processing rate. Thus, all processing occurs at about 2400–2600 parts per minute. This results from using an apparatus with all rotary machines, and a plurality of inspection stations, which allows continuous processing of the caps. This also results from using suction to separate properly formed from improperly formed caps. Thus, no additional device is necessary to collect and store information about the classification of the cap that must be used later.

Another advantage is that suction removes undesirable gases from the liners. An additional advantage, is that improperly formed caps are positively removed from the station. This results from using spring loaded inspection stations. In this way, improperly formed caps, which inadvertently stick to the station due to the stickiness of the liner are not treated like a properly formed cap because the spring forces the cap away from the inspection station.

While embodiments of the present invention have been shown and described, various modifications may be made without departing from the scope and spirit of the present invention, and all such modifications and equivalents are intended to be covered.

What is claimed is:

1. A method of processing caps comprising the steps of:

molding at an elevated temperature a liner having a raised sealing ring with an upper surface inside the cap to form a lined cap;

advancing a stream of lined caps from a first position to a second position while supplying cooling air to the lined caps to cool the liner sufficiently rapidly to form a skin at least on the upper surface of the sealing ring before the caps arrive at the second position for further processing, wherein the step of advancing further includes:

providing a rotating first turntable for receiving the lined caps at the first position and advancing the lined caps to the second position;

providing a cooler for supplying cooling air;

providing an open-ended enclosure extending between the first position and the second position, the enclosure forming a channel through which the first turntable rotates, the enclosure being adapted to receive the cooling air in the channel, so that as the first turntable moves the lined caps from the first position to the second position through the channel the liner is exposed to the cooling air and is cooled sufficiently rapidly to form the skin at least on the upper surface of the sealing ring before the lined caps arrive at the second position;

providing a rotating second turntable for receiving lined caps from the first turntable at the second position and advancing the lined caps toward a third position;

providing a vacuum pump for drawing a vacuum and applying it to the caps on the second turntable; and providing at least one inspection station being coupled to the second turntable.

2. The method of claim 1, wherein the step of providing at least one inspection station further includes:

providing a housing defining a channel in fluid communication with the vacuum pump and having a working end;

providing a vacuum tip connected to the working end of the housing, the vacuum tip having a central passage for fluid communication between the channel and the exterior of housing;

providing a stopper movable between open and closed positions for selectively opening and closing the central passage; and providing a spring disposed with the channel for creating a spring force that biases the stopper towards the closed position, wherein when the inspection station is at the second position, lined caps disposed below the vacuum tip force the stopper toward the open position, with the vacuum pump applying a suction force to the lined cap sufficient to lift the lined cap into contact with the vacuum tip, such that if the lined cap is properly formed the suction force is greater than the spring force and the cap travels on the inspection station to the third position, and if the lined cap is improperly formed the spring force is greater than the suction force so that the spring biases the stopper into the closed position causing the cap to lose contact with the vacuum tip.

3. A method of processing caps comprising the steps of:

molding at an elevated temperature a liner having volatiles and a raised sealing ring with an upper surface inside the cap to form a lined cap; and advancing a stream of lined caps from a first position to a second position while supplying cooling air to the lined caps to cool the liner sufficiently rapidly to form a skin at least on the upper surface of the sealing ring before the caps arrive at the second position for further processing;

wherein the further processing includes removing properly formed lined caps from the advancing stream, and the step of further processing includes the step of applying a vacuum to the liner within the raised sealing ring to create suction to lift properly formed lined caps from the advancing stream for removal therefrom, and the vacuum being sufficient to remove the volatiles from the liner.

4. The method of claim 3, wherein the further processing comprises the step of collecting properly formed lined caps by removing the vacuum to release the properly formed caps.

5. The method of claim 3, further including providing an open-ended enclosure extending between the first position and the second position, the enclosure forming a channel through which the advancing stream of lined caps moves, and the cooling air is supplied to the channel.

6. The method of claim 3, wherein the molding and advancing steps are operated at the same processing rate.

* * * * *